(12) United States Patent
Torres

(10) Patent No.: US 10,915,746 B1
(45) Date of Patent: Feb. 9, 2021

(54) METHOD FOR ADAPTIVE CONTRAST ENHANCEMENT IN DOCUMENT IMAGES

(71) Applicant: INTUIT INC., Mountain View, CA (US)

(72) Inventor: Terrence J. Torres, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 79 days.

(21) Appl. No.: 16/265,588

(22) Filed: Feb. 1, 2019

(51) Int. Cl.
*G06K 9/00* (2006.01)
*G06T 5/00* (2006.01)
(Continued)

(52) U.S. Cl.
CPC ........... *G06K 9/00463* (2013.01); *G06K 9/40* (2013.01); *G06K 9/42* (2013.01); *G06T 5/009* (2013.01); *G06T 5/20* (2013.01); *G06K 2209/01* (2013.01)

(58) Field of Classification Search
CPC ....... G06T 5/009; G06T 11/60; G06T 7/0012; G06T 2207/30061; G06T 2207/30096; G06T 7/11; G06T 2207/10076; G06T 2207/10081; G06T 2207/20072; G06T 2207/30242; G06T 7/136; G06T 7/246; G06T 11/001; G06T 2207/20021; G06T 2207/10116; G06T 2207/10136; G06T 2207/30004; G06T 2207/30016; G06T 2207/30044; G06T 2207/30056; G06T 2207/30068; G06T 2207/30081; G06T 2207/30084; G06T 7/174; G06T 7/62; G06T 7/90; G06T 2207/10048; G06T 2207/20092; G06T 5/002; G06T 2207/20216; G06T 2207/1004; G06T 11/00; G06T 1/0007; G06T 2207/20084; G06T 2210/41; G06T 2219/2012; G06T 3/0093; G06T 5/00; G06T 7/00; G06T 7/001; G06T 1/0021; G06T 1/0028; G06T 1/0064; G06T 1/0071; G06T 2201/0065; G06T 7/0002; G06T 2207/10024;
(Continued)

(56) References Cited

U.S. PATENT DOCUMENTS 7,146,031 B1 * 12/2006 Hartman ................ G06T 7/0012
382/132
10,002,301 B1 * 6/2018 Mahmoud ............. G06F 40/174
(Continued)

OTHER PUBLICATIONS

J. Baek, "Fast Document Rectification and Enhancement", Dropbox, Aug. 16, 2016, 11 pages.
(Continued)

*Primary Examiner* — Nimesh Patel
(74) *Attorney, Agent, or Firm* — DLA Piper LLP (US)

(57) ABSTRACT

Systems and methods here may include utilizing a computer with a processor and a memory for receiving a pixelated image of an original size, converting the pixelated image to grayscale, calculating a magnitude of spatial gradients in the received pixelated grayscale image, downscaling the received pixelated grayscale image, computing a multiplicative gain correction for the downscaled received pixelated grayscale image, re-enlarging a gain multiplication for the original image, and applying the gain multiplication to the image to generate a processed image with higher contrast than the received pixelated image.

20 Claims, 7 Drawing Sheets

(51) Int. Cl.
*G06K 9/40* (2006.01)
*G06K 9/42* (2006.01)
*G06T 5/20* (2006.01)

(58) Field of Classification Search
CPC ......... G06T 7/0004; G06T 2207/20192; G06T 3/403; G06T 7/12; G06T 7/13; G06T 3/40; G06T 17/00; G06T 17/005; G06T 17/05; G06T 2207/10061; G06T 2210/36; G06T 2210/56; G06T 9/00; G06T 9/001; G06T 11/40; G06T 15/503; G06T 2200/24; G06T 2207/10008; G06T 2207/10016; G06T 2207/30176; G06T 5/003; G06T 7/0014; G06T 7/162; G16H 30/40; G16H 30/20; H04N 1/40012; H04N 1/60; H04N 5/2258; H04N 5/238; H04N 5/265; H04N 9/69; H04N 9/73; H04N 9/3182; H04N 17/02; H04N 1/00127; H04N 1/00129; H04N 1/644; H04N 9/64; H04N 1/465; H04N 1/6027; H04N 9/315; G09G 2360/16; G09G 2320/0666; G09G 2320/0242; G09G 3/2003; G09G 2320/0673; G09G 2320/0693; G09G 3/3607; G09G 5/02; G09G 2320/0626; G09G 2340/06; G09G 2360/145; G09G 2300/0452; G09G 2320/0233; G09G 3/3611; G09G 2320/0271; G09G 3/3406; G09G 1/285; G09G 3/20; G09G 2300/0465; G09G 2320/0606; G09G 2370/08; G09G 3/3258; G09G 3/3413; G09G 2380/08; G09G 3/2092; G09G 5/003; G09G 5/026; G09G 2300/0443; G09G 2320/062; G09G 2320/103; G09G 2320/02; G09G 2320/0238; G09G 2320/041; G09G 3/2077; G09G 2320/0653; G09G 2320/066; G09G 2320/0257; G09G 3/3233; G09G 2340/0428; G09G 3/2022; G09G 2320/068; G09G 2320/0686; G09G 2340/02; G09G 3/2081; G09G 5/14; G02F 1/133528; G02F 1/133602; G02F 1/29; G02F 1/292; G02F 2001/291; G02F 2201/305; G02F 2201/44; G02F 1/133514; G02F 1/13624; G02F 2001/134345; G02F 2201/52; G02F 1/133603; G02F 1/133621; H01L 27/3216; H01L 27/3218; H01L 27/3244; H01L 51/5275; H01L 51/5281; G06K 9/0014; G06K 2209/05; G06K 9/4652; G06K 9/4671; G06K 9/46; G06K 7/10702; G06K 7/1098; G06K 9/00013; G06K 19/06037; G06K 9/4604; G06K 2207/1012; G06K 7/10712; G06K 9/2036; G06K 2209/01; G06K 9/00201; G06K 9/00805; G06K 9/74; G06K 9/6212; G01J 2005/0077; G01J 3/0208; G01J 3/2823; G01J 3/45; G01J 3/36; G01J 5/02; G01J 5/089; G01J 5/0896; A61B 10/0233; A61B 2017/3411; A61B 2017/3413; A61B 2090/374; A61B 2090/378; A61B 8/4416; A61B 8/5238; A61B 90/10; A61B 5/015; A61B 1/00006; A61B 1/00009; A61B 1/00016; A61B 1/0005; A61B 1/05; A61B 5/0077; A61B 5/01; A61B 5/055; G01S 3/8034; G01S 7/64; G01S 7/52071; H01S 5/34333; H01S 5/4043; H01S 5/4093; G06F 3/04886; G06F 3/1415; G06F 3/011; G06F 3/018; G06F 40/174; G06F 3/12; G06F 3/0484; G06F 3/04842; G06F 3/04845; G06F 3/0488; B42D 25/23; B42D 25/00; B42D 2033/20; B42D 2035/24; B42D 25/328; B42D 25/29; B42D 25/43; B42D 25/24; B42D 25/309; G03F 1/36; G03F 1/70; G03F 1/42; G03F 1/76; G03F 7/70441

See application file for complete search history.

(56) References Cited

U.S. PATENT DOCUMENTS

| | | | | |
|---|---|---|---|---|
| 2006/0050788 | A1* | 3/2006 | Techmer | G06K 9/228 375/240.12 |
| 2013/0182950 | A1* | 7/2013 | Morales | H04N 1/4072 382/167 |
| 2017/0024852 | A1* | 1/2017 | Oztireli | G06T 5/50 |
| 2018/0099521 | A1* | 4/2018 | Wu | B42D 25/23 |

OTHER PUBLICATIONS

C. Dong et al., "Character-Based LSTM-CRF with Radical-Level Features for Chinese Named Entity Recognition", NLPCC-ICCPOL, 2016, pp. 239-250.
Z. Huang et al., "Bidirectional LSTM-CRF Models for Sequence Tagging", arXiv:1508.01991v1, Aug. 9, 2015, 10 pages.
D. Kingma et al., "ADAM: A Methodfor Stochastic Optimization", arXiv:1412.6980v9, Jan. 30, 2017, 15 pages.
B. Lin et al., "Multi-Channel BiLSTM-CRF Model for Emerging Named Entity Recognition in Social Media", Proceedings of the 3rd Annual Workshop on Noisy User-Generated Text, Sep. 7, 2017, pp. 160-165.
A. Newell et al., "Stacked Hourglass Networks for Human Pose Estimation", arXiv:1603.06937v2, Jul. 26, 2016, 17 pages.
Y. Pai et al., "Adaptive Thresholding Algoritm: Efficient Computation Technique Based on Intelligent Block Detection for Degraded Document Images", Pattern Recognition, vol. 43, Issue 9, Sep. 10, 2010, pp. 3177-3187.
Sauvola et al., "Adaptive Document Image Binarization", Patter Recognition vol. 33, (2000), pp. 225-236.
Y. Xiong, "Fast and Accurate Document Detection for Scanning", Dropbox, Aug. 9, 2016, 9 pages.

\* cited by examiner

METHOD FOR ADAPTIVE CONTRAST ENHANCEMENT IN DOCUMENT IMAGES

DETAILED DESCRIPTION

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the invention to these particular embodiments. In other instances, well-known data structures, timing protocols, software operations, procedures, and components have not been described in detail so as not to unnecessarily obscure aspects of the embodiments of the invention.

This application relates to the field of pixelated image analysis and editing including contrast enhancement in document images.

Current image recognition and contrast image enhancement techniques struggle to pre-process pixelated images to produce crisp, clear results, especially for mobile phone type use cases.

Systems and methods here may include utilizing a computer with a processor and a memory for receiving a pixelated image of an original size, converting the pixelated image to grayscale, calculating a magnitude of spatial gradients in the received pixelated grayscale image, downscaling the received pixelated grayscale image, computing a multiplicative gain correction for the downscaled received pixelated grayscale image, re-enlarging the gain correction factor to the original size, computing a gain multiplication for the original image, and applying the gain multiplication to the original image to generate a processed image with higher contrast than the received pixelated image.

Overview

In today's world, paper documents such as receipts and tax forms still exist. However, as digitization takes over, it is often useful to turn information found on paper documents into pixelated text to be stored and manipulated using computers.

The methods described here include pixelated methods for extracting data from images of paper documents using various contrast enhancement techniques. These are considered pre-processing steps which may be taken to enhance the effectiveness of later optical character recognition (OCR) of such documents. Pre-processing such as contrast enhancement described herein may reduce gray or blurry backgrounds in an image, and enhance weak text characters. Also unlike current text image binarization methods, smoother character boundaries may be achieved without the need for synthetic blurring. By increasing the contrast between identified background and identified text, the text can be more accurately processed using OCR.

Figure 1:
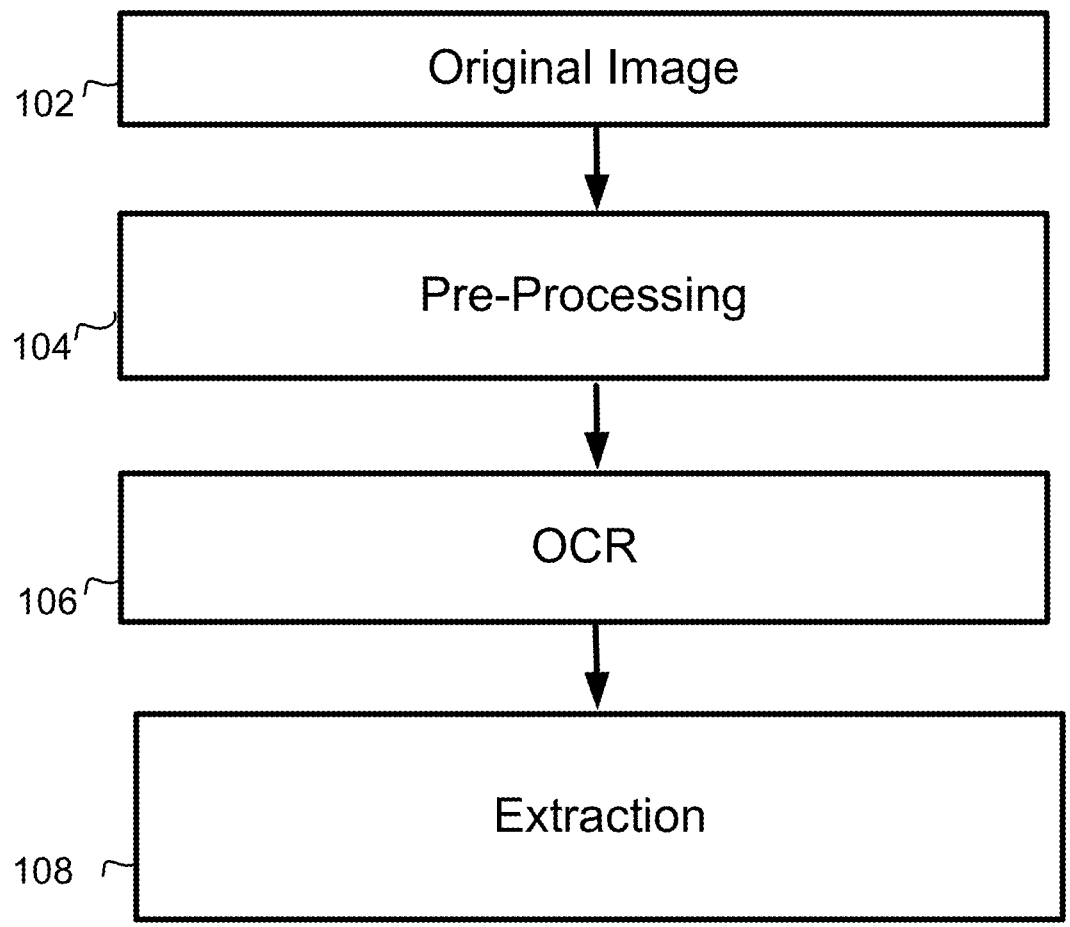
FIG. 1 shows example text capture steps which may be used by the methods and system disclosed herein.

FIG. 1 shows example steps of document understanding that may be accomplished to extract data regarding text from images of paper documents that include such text. First, 102, the original image is captured. Such an original image may be captured using a mobile device. Such images may include noisy content, or have papers not aligned to the camera and skewed. Next, 104 pre-processing the image may be used to improve the accuracy of the eventual text extraction. Pre-processing may include removing the background, correction of the orientation of the source paper, correction of the lighting or shadows depicted in the image. Next, 106 OCR may extract all text found in the image. Finally, 108, the extraction may find relevant information, and/or to categorize and extract as values.

Network Examples Including Image Receipt

As discussed, in some examples, paper documents such as tax forms or paper receipts are found and used in commerce. It would be advantageous to obtain digitized or pixelated copies of such paper records to identify the text on them for processing, storage, or other use. More and more, the easiest way for people to obtain such digitized or pixelated copies is to use a smartphone or mobile device to take a picture of the paper.

Figure 2:
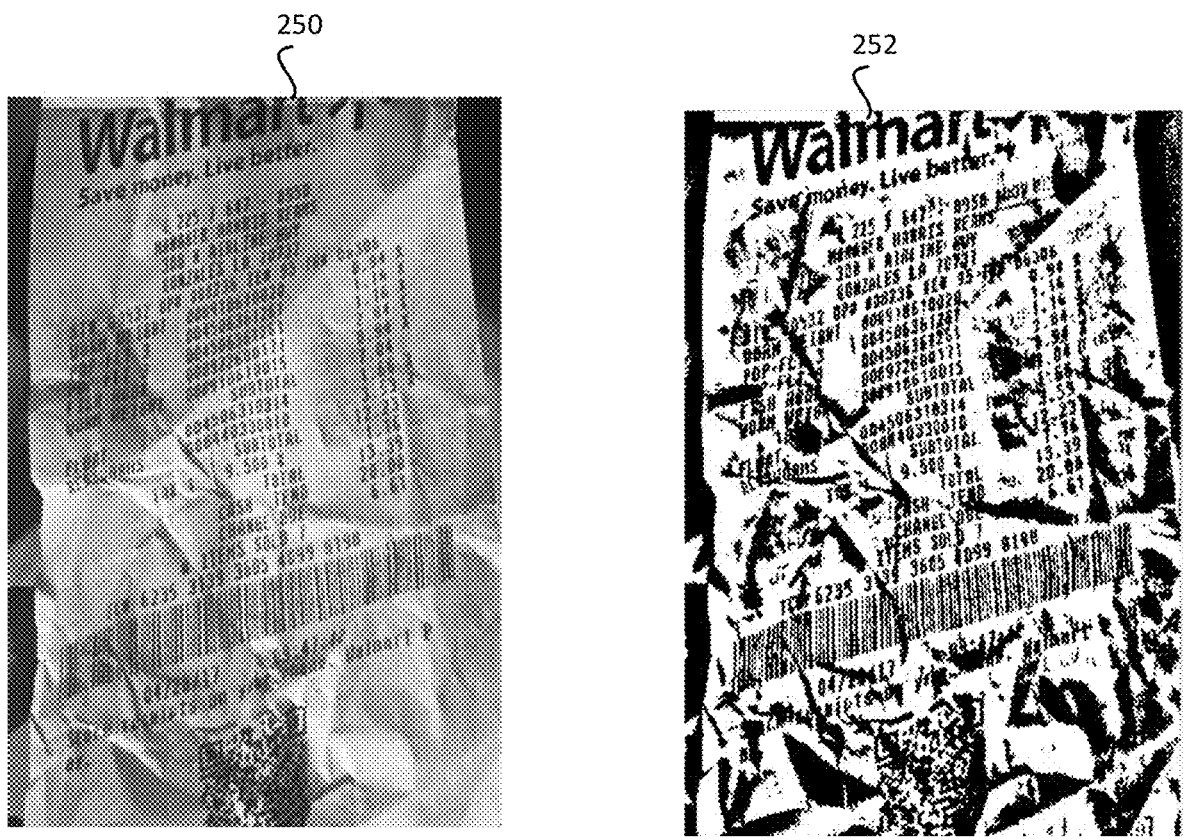
FIG. 2 shows example captured and binarized images which may be improved by the methods and system disclosed herein.

Problems may arise, however, in extracting information about the text from such images due to the difficulty of recognizing any text due to any of various conditions of the original paper source, or the image taking process. For example, an image taken from a smartphone of a paper receipt may not be completely aligned with the camera lens. Other photographic noise such as shadows, flash wash-outs, paper folds, crinkles, or other photographic features may cause degradation of text within images. Also, in some situations, the paper form may have lightly printed text to begin with, which means an image of such lightly printed text, in sub-optimal mobile phone image captures, may result in illegible and difficult to OCR text. Such images of paper documents often have blurry text, backgrounds that confuse OCR systems, poor lighting conditions, and other characteristics that make OCR more difficult and/or less accurate. FIG. 2 shows an example captured image 250 from a mobile smartphone camera. When turned to grayscale and binarized 252 the image shows crinkled and shadowed portions which may be hard for an OCR system to accurately interpret as text or extract text from the image.

Using the methods here, an input such as a first image capture of a paper receipt or form may be processed to enhance the ability to OCR such documents. The systems and methods as described herein may then store such an image and begin the processing of the image with the goal of turning any identified text as black as possible and any identified background as white as possible before the OCR process is performed.

Image Capture and Pre-Processing

Figure 3:
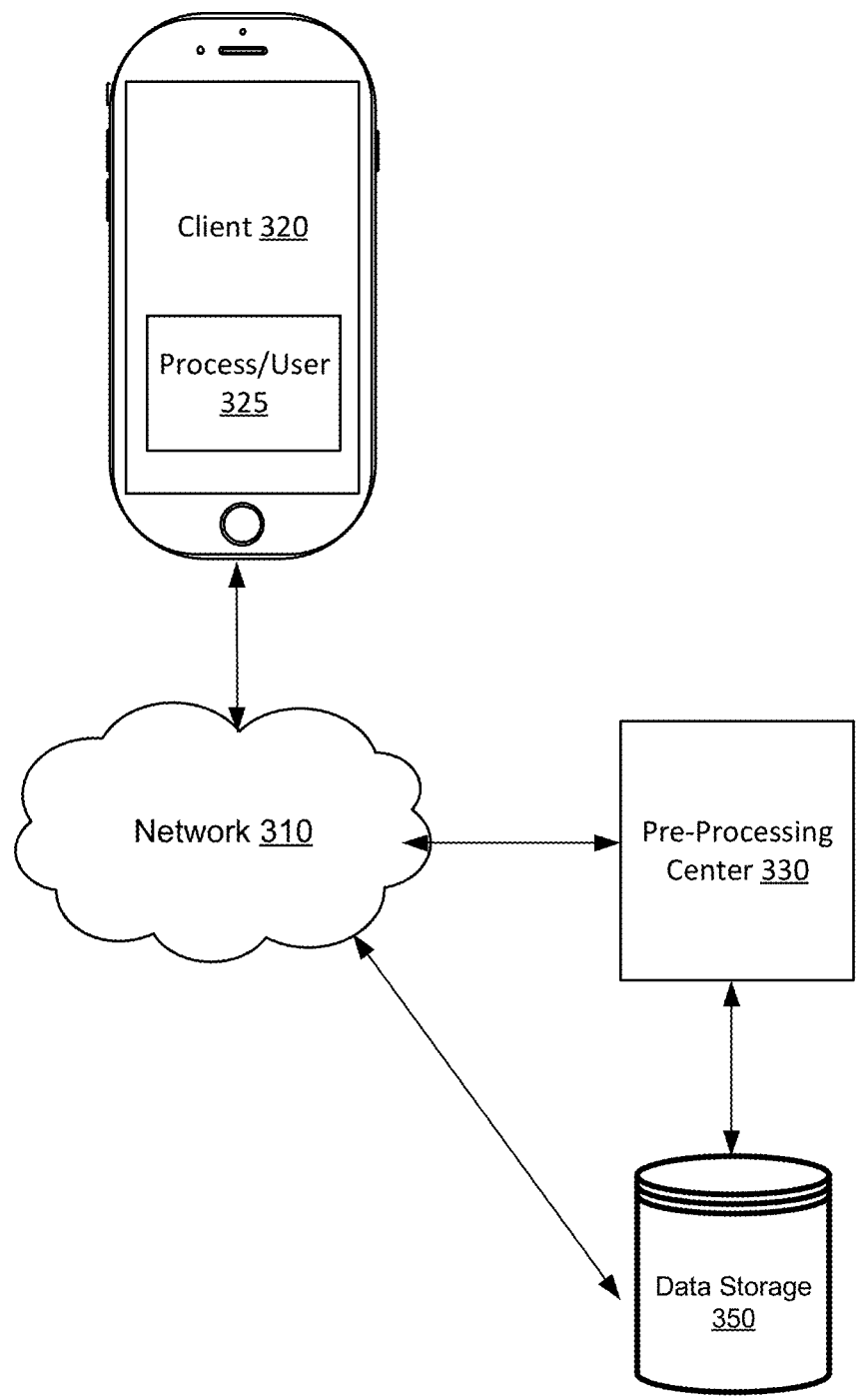
FIG. 3 is a network diagram showing hardware used to execute the example steps as described in the embodiments disclosed herein.

FIG. 3 shows an example network 300 which may be used to practice the methods described herein. Network 300 may include elements such as at least one mobile device, or client 320, pre-processing center 330, and/or at least one data storage 350. In the examples described herein, the mobile client device 320 may be used to capture an image using its associated camera. Image data may then be sent to a pre-processing center 330 by way of a network 310 where the image may be processed and/or stored 350. In some example embodiments, software may reside on the client 320 itself and the pre-processing and/or storage may be conducted on the client 320.

Figure 7:
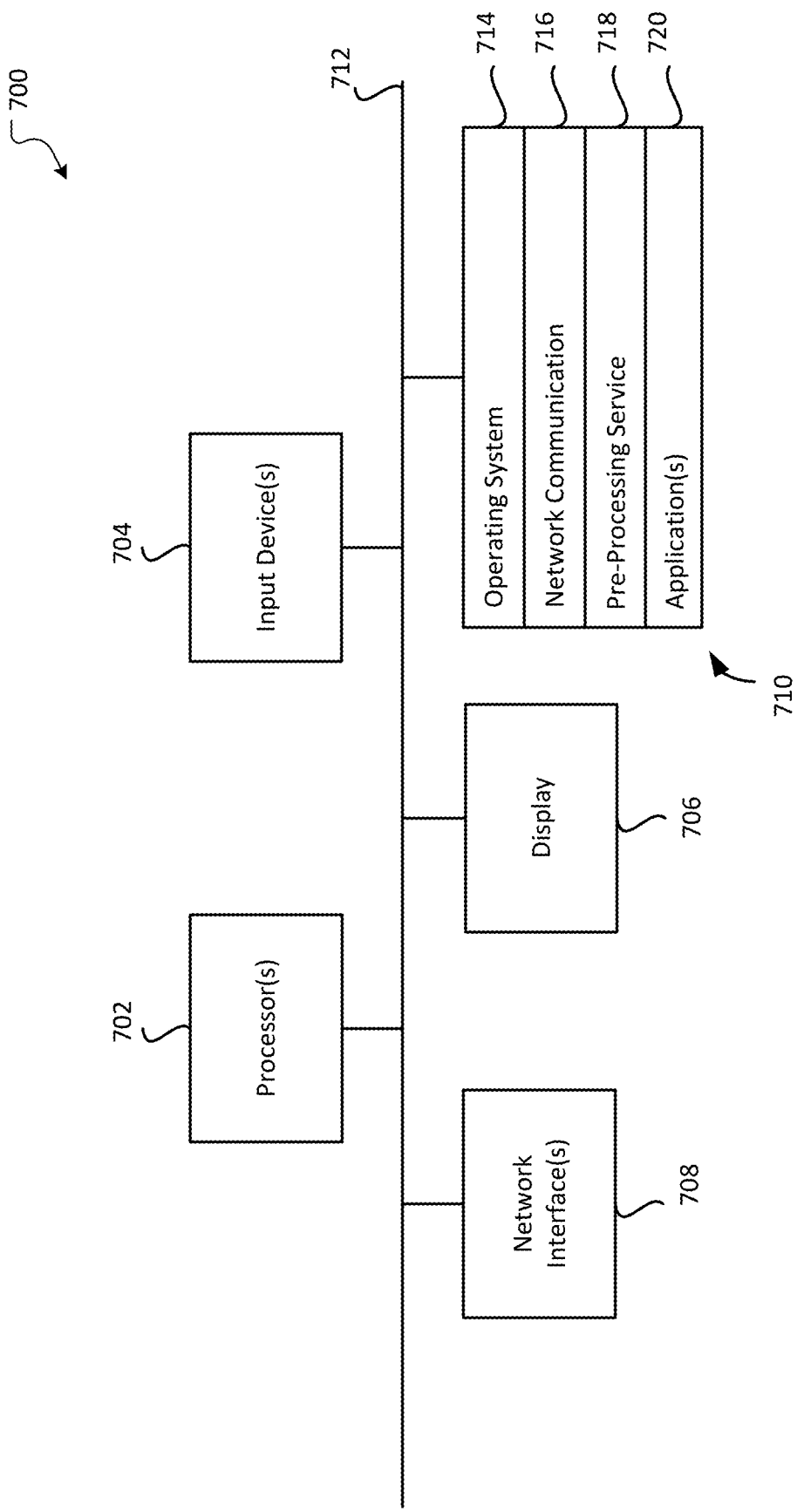
FIG. 7 is an example computing system which may be used in the embodiments disclosed herein.

Each of these elements from FIG. 3 may include one or more physical computing devices (e.g., which may be configured as shown in FIG. 7) distributed computing devices, local computing devices, or any combination of computing devices. In some embodiments, one or more data storages 350 may be provided by the same computing device and/or the same device that provides pre-processing center 330. In some embodiments, client 320 and data storage 350 may be provided by a single computing device. In some embodiments, client 320 may be any device configured to provide access to services. For example, client 320 may be a smartphone, personal computer, tablet, laptop computer, smart watch, other wearable, or any other computing device. In some embodiments, data storage 350 may be any device configured to host a service, such as a server or other device or group of devices. In some embodiments, client 320 may be a service running on a device, and may consume other services as a client of those services (e.g., as a client of other service instances, virtual machines, and/or servers).

The elements may communicate with one another through at least one network 310. Network 310 may be the Internet and/or other public or private wired or wireless networks or combinations thereof. For example, in some embodiments, at least data pre-processing center 330, and/or at least one data storage 350 may communicate with one another over secure channels (e.g., one or more TLS/SSL channels). In some embodiments, communication between at least some of the elements of system 300 may be facilitated by one or more application programming interfaces (APIs). APIs of system 300 may be proprietary and/or may be examples available to those of ordinary skill in the art such as Amazon® Web Services (AWS) APIs or the like.

Specific examples of the processing performed by the elements of system 300 in combination with one another are given below. However, the roles of client 320, pre-processing center 330, and data storage 350 may be summarized as follows. Client 320 may acquire an image by use of its associated camera feature(s). Client 320 may then locally store such image data and/or send the image data via the network 310 to the pre-processing center 330 where the pre-processing may take place as described in FIGS. 4 and 6. In some examples, image data may be stored in local and/or distributed data storage 350.

Client 320, pre-processing center 330 and data storage 350 are each depicted as single devices for ease of illustration, but those of ordinary skill in the art will appreciate that client 320, pre-processing center 330 and/or data storage 350 may be embodied in different forms for different implementations. For example, any of client 320, pre-processing center 330 and/or data storage 350 may include a plurality of devices, may be embodied in a single device or device cluster, and/or subsets thereof may be embodied in a single device or device cluster. A single user may have multiple clients 320, and/or there may be multiple users each having their own client(s) 320. Client(s) 320 may each be associated with a single process 325, a single user 325, or multiple users and/or processes 325. Furthermore, as noted above, network 310 may be a single network or a combination of networks, which may or may not all use similar communication protocols and/or techniques.

Method Process Step Examples

Figure 4:
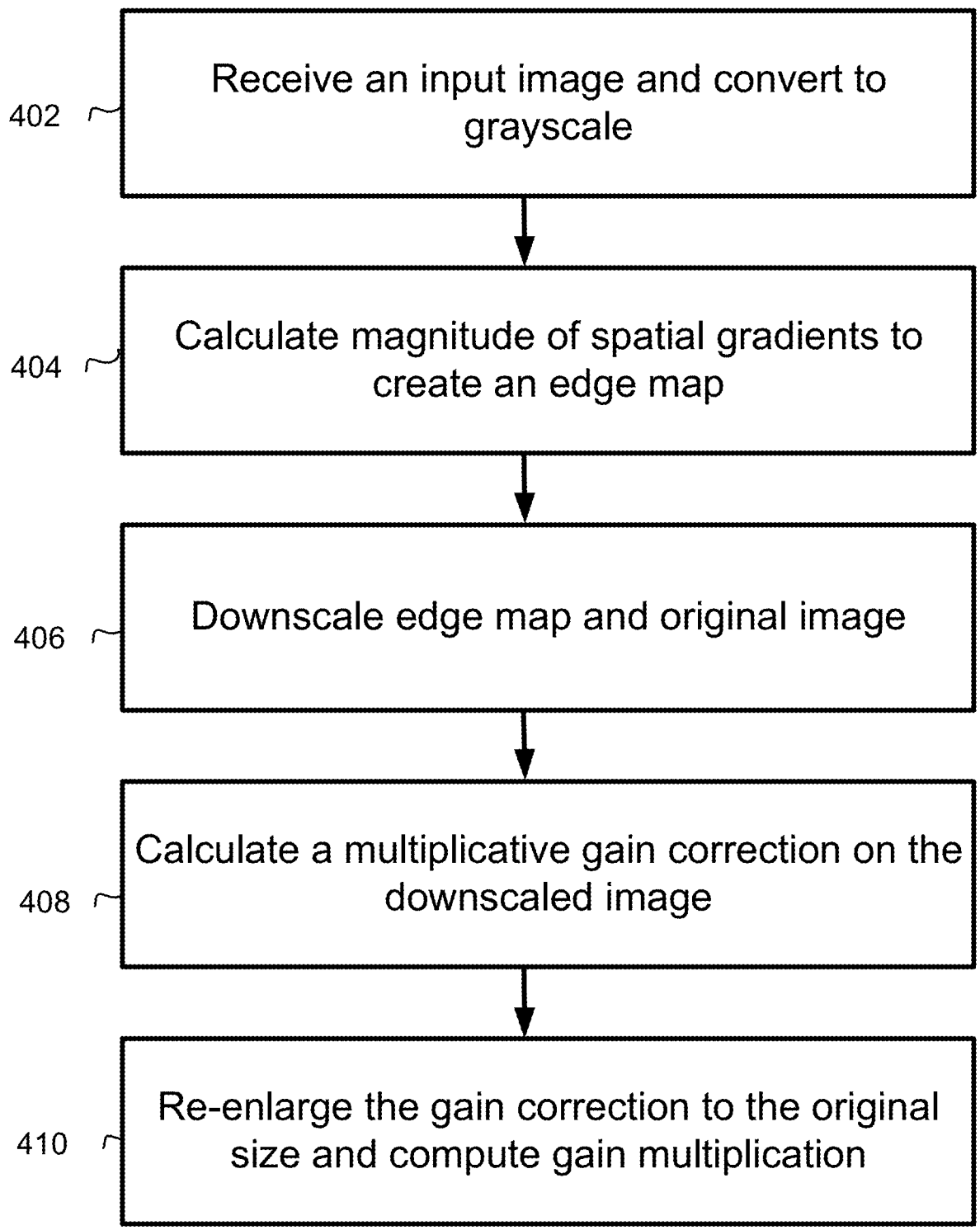
FIG. 4 is a flow chart showing contrast enhancement example steps as described in the embodiments disclosed herein.

FIG. 4 shows an example flow chart which may include the steps taken by the pre-processing systems described herein to reach the goals described above and enhance contrast between text and background in a captured image. The optimization objective function includes two competing constraints: the sum of the distance of each pixel from pure white should be minimized; and the sum of the differences between the spatial gradients in the original image and the optimized image should be minimized. A gain multiplier is calculated for the pixel intensities on a downscaled image so when the gain multipliers are upscaled to the original image size, the image gain correction creates high contrast in the local neighborhoods of the image.

$$L_{white} = \sum_i^W \sum_j^H (1 - O(i, j))^2$$

$$L_{grad} = \sum_i^W \sum_j^H (|\nabla I(i, j)| - |\nabla O(i, j)|)^2$$

$$L_{total} = L_{white} + k \cdot L_{grad}$$

Where I(i,j) is the input image, O(i,j) is the output image, and k is a constant trade off between the two loss components. A multiplicative gain factor is then optimized through gradient descent for local neighborhoods in the image to derive a local intensity correction map and the final image result is produced by multiplying the optimized gain corrections with the original image. The full image optimization then proceeds as in the example algorithm.

In an example, the algorithm may include gradient descent optimization of local gain correction factor for adaptive contrast enhancement. In the example algorithm, an image is received, such as an image taken by a camera on a mobile device, and once received, that image may be converted to grayscale 402. Such a conversion would convert each pixel into an either black pixel or white pixel, or some grayscale step in between black and white. No color pixels would be left in such an example image.

Next, the method could calculate the magnitude of spatial gradients in the original received image 404. Such calculation may be done using Sobel filters in some examples. The result of calculating the magnitude of spatial gradients on the image would be the creation of an edge map highlighting all of the regions of high contrast between black and white. For text examples, such an edge map would preserve the images of the text characters by indicating the higher spatial gradients to help identify where the edges exist between text characters (to be made black) and background (to be made white).

Next, the grayscale image and edge map may be downscaled by a factor S 406. Such a downscale may be a drop in resolution of the image and edge map. This provides both local neighborhood preservation as well as computational efficiency. For example, instead of processing an image, pixel-by-pixel, calculations are used to interpolate blocks of pixels to be processed. For example, twenty-by-twenty pixel blocks may be used. In some examples, five-by-five pixel blocks may be used. Any resolution downscale may be used in similar fashion by grouping blocks of pixels. The goal with dropping the image and edge map resolution is to save on computing resources and time needed to compute the contrast enhancement process as well as to preserve smooth relative intensities of local neighborhoods in the image. Many mobile devices today can create images with very high resolutions resulting in millions of pixels to be processed. As analysis and processing of each of the pixels in an image takes a certain amount of computing resources, by dropping the number of pixels that are processed, by grouping them into blocks, computing resources are saved. This may allow for quicker and more efficient image processing.

Next, the method calculates a random multiplicative gain correction, G, with mean 1, on the reduced, downscaled image 408. This may include optimizing the objective function of the sum of the distance of each pixel from pure white should be minimized; and the sum of the differences between the spatial gradients in the original image and the optimized image should be minimized.

Finally, the enhanced image may be computed by first computing the final gain correction 410 and then upscaling the gain factor to the original image size and performing pixel-wise multiplication. For example, this step could apply the calculated gain correction to the original pixel values to drive toward the objective function. In some examples, the re-enlargement is to the original image size. This process may be used to lighten the pixel blocks that are closer to the white side of the grayscale spectrum and darken the pixel blocks that are closer to the black side of the spectrum, thereby increasing or enhancing the contrast between the black and white elements.

The Algorithm can be summarized as:
for maximum number of optimization iterations: compute element-wise multiplication of gain and input image, $O=G\times 1$
compute spatial gradient $\nabla O$
Calculate loss function $L_{total}$
Backpropogate gradients and update G using gradient descent
Take the element-wise product of rescaled gain correction and original image to obtain final optimized image In some example embodiments, the above process steps 402, 404, 406, 408, and 410 may be repeated to the new image to further enhance the contrast between characters and background. This repeating of steps may be iteratively processed to achieve more and more contrast in each successively processed image.

In some examples, a noisiness factor may be calculated for an image. After one round of processing as described in FIGS. 4 and 6, a second noisiness factor may be calculated on the processed image. In some examples, the system may repeat such processing until it is determined that the difference in successive noisiness factors are not being reduced beyond a set threshold, and such calculations may be used to determine how many rounds of processing are needed or desired.

Figure 5:
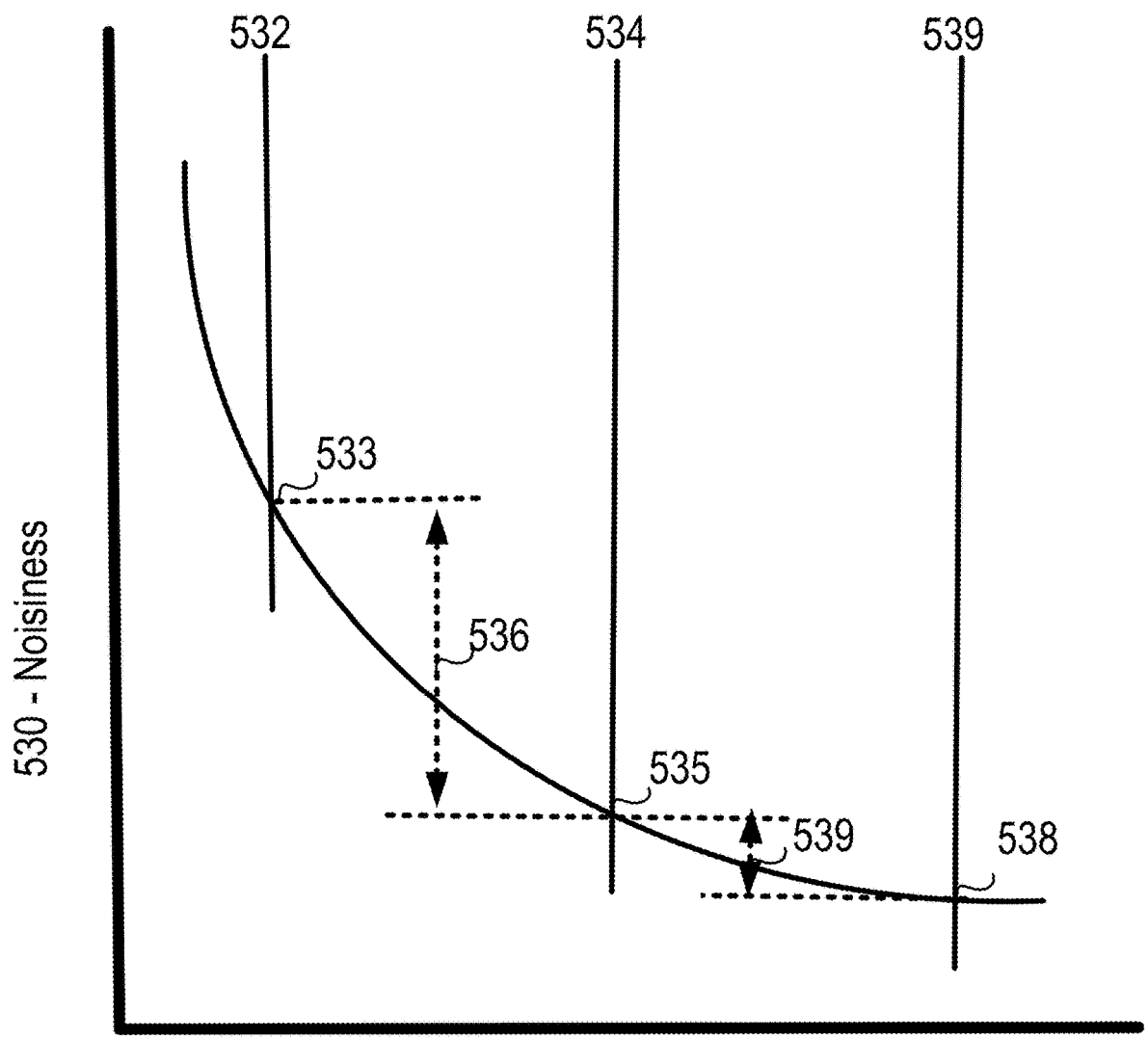
FIG. 5 is an example noisiness chart that may be used in the embodiments disclosed herein.

FIG. 5 shows an example chart comparing a noisiness factor 530 calculated for three successive processes of an image 532, 534, 539. In such examples, a noisiness factor may be calculated for each iteration in order to compare to successively processed. The first image 532 is calculated at a noisiness level 533. After one round of processing 534, a second noisiness factor is calculated 535. The difference between the first 532 and second 534 images is calculated 536. Then a third round of processing is performed that results in a third image 539 for which a noisiness factor is calculated 538. The difference 539 between the second noisiness factor 535 and third nosiness factor 538 is calculated.

A comparison may be made of the differences between the first and second image 536 and the second and third image 539 to calculate the incremental gain achieved in each successive round of processing. Once a set threshold is passed, and incremental gains in noisiness reduction are met, the steps may end.

For example, if the difference in noisiness levels calculated between the first image 532 and second image 534 after one round of processing is calculated 536 to be 10 but then the difference in noisiness between the second image 534 and third image 539 after another round of processing is found to be 2, that may be enough for the method of end, having only gained 2 on the noisiness from second 622 to third image 624.

In some examples, a set number of steps may be programmed to be performed on one image. Such a step threshold may allow for the process to take a set amount of time.

In some examples, both the step counter and noisiness determination may each be running at the same time on the same image process, and the processing may stop when either one reaches its set threshold first. In such a way, the noisiness determination may cut short a pre-programmed number of steps, and thereby save time and computing resources, while still producing a good result.

Example Images

Figure 6:
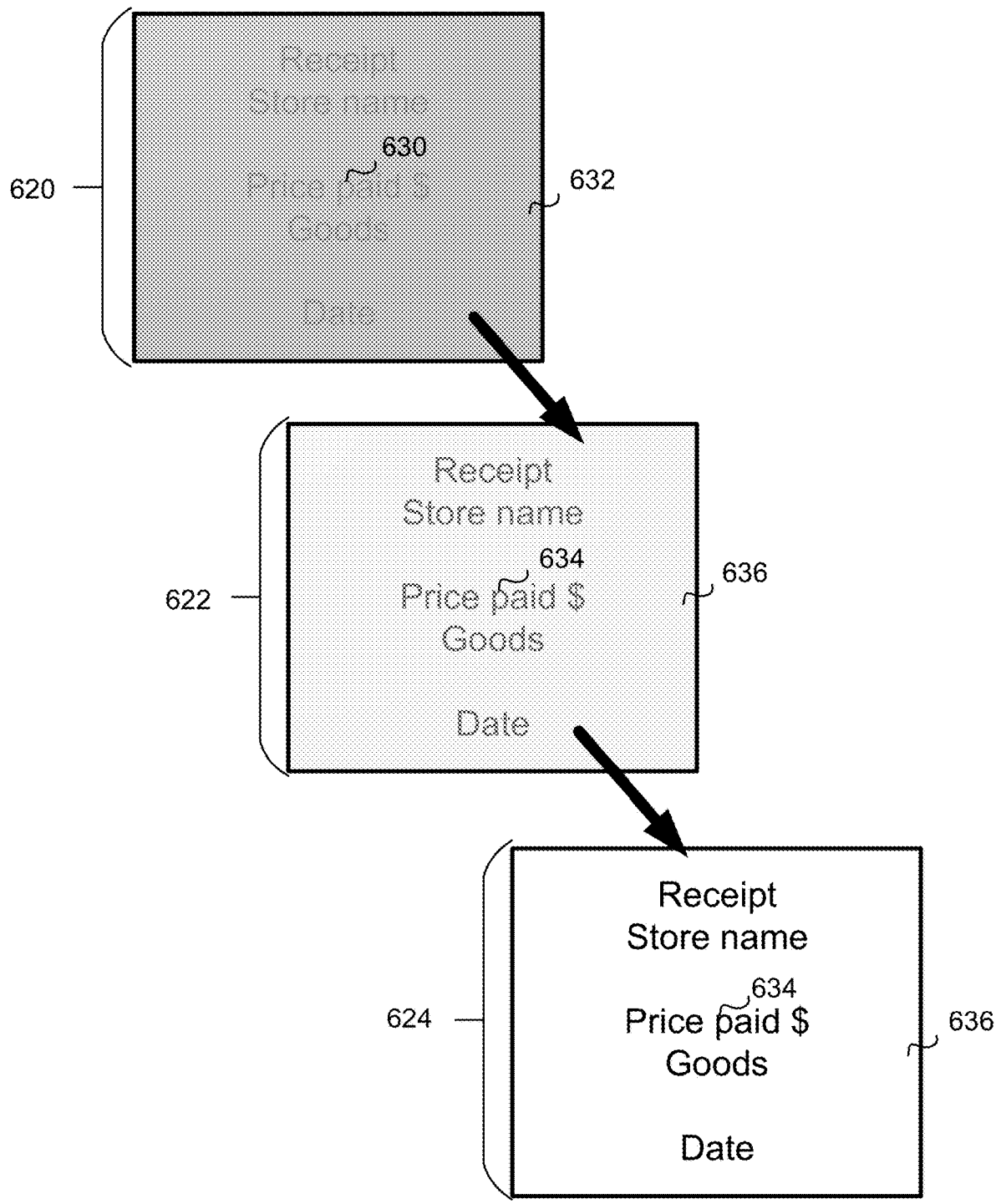
FIG. 6 are diagrams showing contrast enhancement example steps as described in the embodiments disclosed herein.

FIG. 6 shows an example iterative process imparted on one image of a paper receipt. In the example, the receipt is received 620 with low contrast between the text 630 and the background of the receipt paper 632. Such a pixelated or digitized image of a receipt may be difficult to process by an OCR system and may result in inaccurate recognition of text.

As shown in the example, after one round of processing, the image 622 is showing improvement in contrast between the text 634 and background 636. After the third round of processing, the image 624 shows an acceptable improvement in contrast between the text 638 and background 640. Such a pixelated or digitized image 624 may be more accurately processed using OCR than the first image 620.

In examples described above, the method may recognize that a pre-set number of steps have been executed, and/or the calculated noisiness levels of the image (as described in FIG. 5), as compared to the previously processed image, meet a threshold and the process may stop.

Any kind of thresholds may be set using the methods described herein. The examples described above are mere examples and not intended to be limiting.

Example Computing Device

FIG. 7 is a block diagram of an example computing device 700 that may implement various features and processes as described herein. For example, computing device 700 may function as client 320, pre-processing center 330 data storage 350, or a portion or combination of any of these elements. In some embodiments, a single computing device 700 or cluster of computing devices 700 may provide each of pre-processing center 330 data storage 350, or a combination of two or more of these services. Computing device 700 may be implemented on any electronic device that runs software applications derived from instructions, including without limitation personal computers, servers, smart phones, media players, electronic tablets, game consoles, email devices, etc. In some implementations, computing device 700 may include one or more processors 702, one or more input devices 704, one or more display devices 706, one or more network interfaces 708, and one or more computer-readable mediums 710. Each of these components may be coupled by bus 712, and in some embodiments, these components may be distributed across multiple physical locations and coupled by a network.

Display device 706 may be any known display technology, including but not limited to display devices using Liquid Crystal Display (LCD) or Light Emitting Diode (LED) technology. Processor(s) 702 may use any known processor technology, including but not limited to graphics processors and multi-core processors. Input device 704 may be any known input device technology, including but not limited to a keyboard (including a virtual keyboard), mouse, track ball, and touch-sensitive pad or display. Bus 712 may be any known internal or external bus technology, including but not limited to ISA, EISA, PCI, PCI Express, NuBus, USB, Serial ATA or FireWire. Computer-readable medium 710 may be any medium that participates in providing instructions to processor(s) 702 for execution, including without limitation, non-volatile storage media (e.g., optical disks, magnetic disks, flash drives, etc.), or volatile media (e.g., SDRAM, ROM, etc.).

Computer-readable medium 710 may include various instructions 714 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 704; sending output to display device 706; keeping track of files and directories on computer-readable medium 710; controlling peripheral devices (e.g., disk drives, printers, etc.) which can be controlled directly or through an I/O controller; and managing traffic on bus 712. Network communications instructions 716 may establish and maintain network connections (e.g., software for implementing communication protocols, such as TCP/IP, HTTP, Ethernet, telephony, etc.).

Pre-processing service instructions 718 may include instructions that perform the various pre-processing functions as described herein. Pre-processing service instructions 718 may vary depending on whether computing device 700 is functioning as client 320, pre-processing center 330, data storage 350, or a combination thereof.

Application(s) 720 may be an application that uses or implements the processes described herein and/or other processes. The processes may also be implemented in operating system 714.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, 7PROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other, or by processes running on the same device and/or device cluster, with the processes having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

CONCLUSION

As disclosed herein, features consistent with the present inventions may be implemented by computer-hardware, software and/or firmware. For example, the systems and methods disclosed herein may be embodied in various forms including, for example, a data processor, such as a computer that also includes a database, digital electronic circuitry, firmware, software, computer networks, servers, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Etc.

What is claimed is:

1. A method for enhancing contrast in a pixelated image, comprising:
by a computer with a processor and a memory,
receiving the pixelated image of an original size of a document, the pixelated image having a contrast between a white pixel and a black pixel;
converting the pixelated image to grayscale;
calculating a plurality of magnitudes of spatial gradients for a first plurality of pixels in the received pixelated grayscale image;
downscaling the received pixelated grayscale image and the plurality of magnitudes of spatial gradients;
computing a multiplicative gain correction for the downscaled received pixelated grayscale image, the computing of the multiplicative gain correction comprising calculating a distance from pure white for a second plurality of pixels in the downscaled received pixelated grayscale image and analyzing the downscaled plurality of magnitudes of spatial gradients;
re-enlarging the gain correction factor to the original size;
computing a gain multiplication for the received pixelated image; and
applying the gain multiplication to the received pixelated image to generate a processed image with higher contrast than the received pixelated image.

2. The method of claim 1 wherein the calculation of spatial gradients is calculated using Sobel filters.

3. The method of claim 1 wherein calculating the magnitude of spatial gradients includes creating an edge map of the pixelated grayscale image.

4. The method of claim 3 wherein downscaling received pixelated grayscale image includes downscaling the edge map.

5. The method of claim 1 wherein the downscaling includes grouping pixels into twenty by twenty blocks.

6. The method of claim 1 further comprising, calculating a noisiness level of the received pixelated image and the re-enlarged gain correction.

7. The method of claim 6 further comprising,
calculating a magnitude of spatial gradients in the processed image;
downscaling the processed image from an original processed image size;
computing a multiplicative gain correction for the processed image;
computing a gain multiplication for the processed image;
applying the gain multiplication to the original image to generate a second processed image with higher contrast than the processed image.

8. The method of claim 7 further comprising, repeating the steps until a set number of steps have been processed.

9. The method of claim 7 further comprising, calculating a noisiness value for the received pixelated grayscale image, the processed image, and the second processed image;
determining a difference between the noisiness values of the received pixelated grayscale image, the processed image, and the second processed image;
repeating the steps until a threshold improvement in differences in noisiness values between successive images is met.

10. The method of claim 1 further comprising, by the computer, extracting text from the processed image with higher contrast using Optical Character Recognition.

11. A system configured to enhance contrast in a pixelated image, comprising:
a computer with a processor and a memory, configured to,
receive the pixelated image of an original size of a document, the pixelated image having a contrast between a white pixel and a black pixel;
convert the pixelated image to grayscale;
calculate a plurality of magnitudes of spatial gradients for a first plurality of pixels in the received pixelated grayscale image;
downscale the received pixelated grayscale image and the plurality of magnitudes of spatial gradients;
compute a multiplicative gain correction for the downscaled received pixelated grayscale image, the computing of the multiplicative gain correction comprising calculating a distance from pure white for a second plurality of pixels in the downscaled received pixelated grayscale image and analyzing the downscaled plurality of magnitudes of spatial gradients;

compute a gain multiplication for the received pixelated image;

apply the gain multiplication to the received pixelated image to generate a processed image with higher contrast than the received pixelated image.

12. The system of claim 11 wherein the calculation of spatial gradients is calculated using Sobel filters.

13. The system of claim 11 wherein calculation of the magnitude of spatial gradients includes creation of an edge map of the pixelated grayscale image.

14. The system of claim 13 wherein downscale of received pixelated grayscale image includes downscale of the edge map.

15. The system of claim 11 wherein the downscale includes grouping pixels into twenty by twenty blocks.

16. The system of claim 11 further comprising, by the computer, calculate a noisiness level of the received pixelated image and the re-enlarged gain correction.

17. The system of claim 16 further comprising, by the computer,
calculate a magnitude of spatial gradients in the processed image;
downscale the processed image from an original processed image size;
compute a multiplicative gain correction for the processed image;
compute a gain multiplication for the original image;
apply the gain multiplication to the original image to generate a second processed image with higher contrast than the processed image.

18. The system of claim 17 further comprising, by the computer, repeat the steps until a set number of steps have been processed.

19. The system of claim 17 further comprising, by the computer, calculate a noisiness value for the received pixelated grayscale image, the processed image, and the second processed image;
determine a difference between the noisiness values of the received pixelated grayscale image, the processed image, and the second processed image;
repeat the steps until a threshold improvement in differences in noisiness values between successive images is met.

20. A method for enhancing contrast in a pixelated image, comprising:
by a computer with a processor and a memory,
receiving the pixelated image of an original size of a document, the pixelated image having a contrast between a white pixel and a black pixel;
converting the pixelated image to grayscale;
calculating a plurality of magnitudes of spatial gradients for a first plurality of pixels in the received pixelated grayscale image;
downscaling the received pixelated grayscale image and the plurality of magnitudes of spatial gradients;
computing a multiplicative gain correction for the downscaled received pixelated grayscale image, the computing of the multiplicative gain correction comprising calculating a distance from pure white for a second plurality of pixels in the downscaled received pixelated grayscale image and analyzing the downscaled plurality of magnitudes of spatial gradients;
re-enlarging the gain correction factor to the original size;
computing a gain multiplication for the received pixelated image;
applying the gain multiplication to the received pixelated image to generate a processed image with higher contrast than the received pixelated image; and
analyzing the processed image with higher contrast using Optical Character Recognition to identify black pixel text characters.

* * * * *